United States Patent [19]

Loretto et al.

[11] 3,926,752

[45] Dec. 16, 1975

[54] DIRECT RECOVERY OF METALS FROM SULPHIDE ORES BY LEACHING AND ELECTROLYSIS

[76] Inventors: John C. Loretto, 4649 - 248th St., Aldergrove, British Columbia; Kenneth E. N. Hanney, 1402 Evelyn St., North Vancouver, British Columbia, both of Canada

[22] Filed: Apr. 4, 1974

[21] Appl. No.: 457,898

[30] Foreign Application Priority Data

Apr. 9, 1973 United Kingdom............... 16920/73

[52] U.S. Cl................................... 204/107; 204/113

[51] Int. Cl............................. C25c 1/12; C25c 1/06

[58] Field of Search............................. 204/107, 113

[56] References Cited

UNITED STATES PATENTS

| | | | |
|---|---|---|---|
| 556,092 | 3/1896 | Frölich | 204/111 |
| 3,736,238 | 5/1973 | Kruesi et al. | 204/107 |
| 3,761,369 | 9/1973 | Tirrell | 204/107 |
| 3,767,543 | 10/1973 | Hazen | 204/107 |

*Primary Examiner*—R. L. Andrews

[57] ABSTRACT

Finely ground copper sulfide ore or concentrate contained in a slurry with ferric chloride and hydrochloric acid is agitated in the anode compartment of an electrolytic cell in which the anode and cathode compartments are separated by an ion passing diaphragm. The slurry is filtered to recover sulfur-containing solids and a filtrate containing cuprous chloride and ferrous chloride. The filtrate is passed to a first cathode compartment in the cell to recover pure copper and the spent electrolyte is treated in a second cathode compartment in the cell to recover metallic iron. Chlorine is liberated in the cathode compartments and migrates to the anode compartment to oxidize ferrous iron and regenerate ferric chloride.

6 Claims, No Drawings

DIRECT RECOVERY OF METALS FROM SULPHIDE ORES BY LEACHING AND ELECTROLYSIS

The present invention relates to a process for treating sulfidic ores for the direct recovery of metals therefrom and, more particularly, to a process combining leaching and electrolytic dissociation for directly recovering metals from their sulfide ores.

Recovery of copper metal from sulfidic ores has, of course, traditionally involved the use of pyrometallurgical techniques which were relatively easy and inexpensive to operate. Such processes have resulted in release to the atmosphere of noxious sulfur-containing gases and there has been recent continuous pressure from governing bodies, primarily by way of certain anti-pollution regulations, to control pyrometallurgical operations or even eliminate them in order to abide by such anti-pollution standards. It can be appreciated that direct electrolytic recovery of metals has, a result, been looked at with increasing interest. A number of procedures for direct recovery of metals from their sulfides have been developed in the prior art, all with varying success. Most of these have involved the use of electrolytic techniques such as, for example, those disclosed in U.S. Pat. Nos. 3,464,904; 2,761,829; 2,331,395; 3,673,061; 3,692,647; and 2,839,461. All of these suffered from various drawbacks, such as low recovery, extreme difficulty in controlling process variables, prohibitively high costs in processing most sulfidic materials and the necessity for separating various process steps in order to make a process workable.

It has now been discovered that copper-bearing sulfide ores can be treated in an operation involving a combination of leaching and electrolysis in a single system for the economic removal of copper metal therefrom at high recovery rates.

In the process of the invention a slurry of finely ground copper sulfide-containing ore or concentrate is agitated in a solution of ferric chloride and hydrochloric acid in the anode compartment of an electrolytic cell which has cathode and anode compartments separated by a diaphragm preventing the movement of solids and liquids but allowing the passage of ions therethrough. The leached slurry is filtered to remove sulfur-containing solids therefrom and recover a filtrate containing cuprous chloride and ferrous chloride. The filtrate is transferred to a first cathode compartment in the cell and copper metal is deposited therefrom on to the first cathode. The copper-poor spent electrolyte formed is treated to substantially eliminate copper and ferric iron therefrom and the so-treated copper-poor electrolyte is fed to a second cathode compartment where iron metal is deposited therefrom onto a second cathode and oxidizing with chlorine ferrous iron in the anode compartment. Chlorine is liberated in the cathode compartments and migrates to the anode compartment where it acts to oxidize the ferrous iron and regenerate the ferric chloride.

It is an object of the present invention to provide a process for the direct recovery of copper metal from its ores or concentrates.

It is a further object of the invention to provide a combined, closed circuit leaching and electrolytic recovery operation to treat copper ores and concentrates for direct recovery of copper therefrom.

Other objects and advantages of the invention will be apparent from the following description outlining in detail a preferred embodiment of the invention.

In the process of the invention copper-containing sulfide ores or concentrates in a finely-divided form are leached in a slurry under agitation in the anode compartment of an electrolytic cell. Ferric chloride is provided as the leaching agent, with sufficient hydrochloric acid being present to prevent precipitation of metal hydroxides. Copper is dissolved from the concentrates by the action of ferric chloride in solution and the reaction, using chalcopyrite as a typical ore being treated, is as follows:

$$6\ FeCl_3 + 2\ CuFeS_2 \rightarrow Cu_2Cl_2 + 8\ FeCl_2 + 4\ S \quad (1)$$

Slurry density in the anode compartment is controlled to avoid exceeding the solubility limits of chlorides of iron and copper. Preferably, the slurry should not exceed 25% solids for single stage leaching with 20% solids being advantageous. Higher solids density could be used safely only by incorporating intermediate solution removal steps.

In the anode compartment an inert anode of carbon, coated titanium or other suitable material is used. The anode compartment is separated from the cathode compartment or compartments in the cell by a diaphragm which prevents movement of solids and liquids but allows passage of ions therethrough. The diaphragm can be of ceramic, or an iron exchange membrane or any other suitable ion porous material.

As described hereinafter, chlorine ions are released in the cathode compartments and these migrate through the diaphragm to the anode compartment, with chlorine being formed at the anode and being retained in the slurry by constant agitation. Ferric chloride is regenerated in the anode compartment by the reaction of this chlorine formed at the anode with ferrous chloride according to the following reaction:

$$6\ FeCl_2 + 3\ Cl_2 \rightarrow 6\ FeCl_3 \quad (2)$$

The leached slurry containing ferrous chloride is removed from the anode compartment and is treated to liquid-solid separation, such as by filtering or thickening, to form a copper-bearing solution and leached solids, the copper-bearing solution then being transferred to a first or copper circuit cathode compartment where copper and chlorine are produced according to the reaction:

$$Cu_2Cl_2 + E \rightarrow 2\ Cu + Cl_2 \quad (3)$$

Metallic copper deposits on the cathode and chloride ions released migrate to the anode compartment, as afore-described. The copper-poor spent electrolyte is treated for removal of residual copper, such as by stripping with iron powder, and ferric iron may be eliminated, if necessary, such as by reduction to ferrous chloride or by precipitation.

The so-treated spent electrolyte is then advantageously treated in a second or iron circuit cathode compartment in the cell to remove iron from the circuit originating in the chalcopyrite concentrate. In the iron circuit cathode compartment metallic iron is deposited at the cathode according to the reaction:

$$2\ FeCl_2 + E \rightarrow 2\ Fe + 2\ Cl_2 \quad (4)$$

Chloride ions released migrate to the anode compartment as afore-described. The chlorine released by reactions (3) and (4) and formed as chlorine gas at the anode provide the chlorine necessary to oxidize the ferrous chloride formed from the ferric chloride reduced in reaction (1) back to ferric chloride in accordance with reaction (2). Although it is most advantageous to have the iron circuit cathode compartment as part of a unitary electrolytic cell, a separate iron cell can be used with metallic iron being plated out therein and gaseous chlorine formed being fed back into the anode compartment of the copper recovery cell.

The leached solids removed from the slurry from the anode compartment are washed to remove copper and iron in solution therefrom and the washings are returned to the anode chamber. The spent iron catholyte is returned to the anode compartment either directly or through the leached slurry solids washing circuit. The washed solids are advantageously treated, such as by froth flotation, to recover any unreacted sulfides, which are returned to the anode compartment for releaching, and the flotation residue, containing sulfur formed in reaction (1), can be treated for sulfur recovery.

Dissolution in the anode compartment proceeds more quickly in strong acid solutions, such as 6N HCl, but is quite satisfactory down to 1N HCl. Since the copper cathode compartment can operate under wide pH limits but the iron deposition in the iron cathode compartment requires only slight acidity then it is most advantageous to operate the circuit at minimum acid levels.

Current density is maintained at as high a level as possible, tests having been run at between 50 and 500 amps/sq. ft. Advantageously then current density of in the order of 500 amps/sq. ft. is appropriate. In test operations voltage has varied between 3 to 6 volts with 3 to 4 volts being an advantageous operating level.

In carrying out the process, it has been found that the use of a diaphragm separating the cathode and anode which has considerably lesser area than that of each of the electrodes accelerates the reaction, probably by concentrating the corrosive leaching action of ferric chloride freshly formed from ferrous chloride and chlorine formed at the anode.

In the anode compartment leaching of sulfide solids by ferric chloride proceeds advantageously if the sulfide concentrate is finely ground such as to 95% minus 325 mesh. Also, increased temperature aids speed of leaching, evaporation being the principal upward limit, and increased retention time of sulfide slurry in the anode dissolution system also assists in more complete leaching in one pass through the anode compartment. Increasing current density speeds up copper dissolution rate, of course, the upper limit being the voltage required, the current-carrying capacity of the components, including the diaphragm and excessive production of chlorine at the anode.

Decreasing the percent solids in the slurry in the anode compartment speeds up recovery but it is considered that such is merely equivalent to raising the current density due to the power/weight of concentrate ratio being correspondingly increased. Increase in ferric chloride addition improves leaching effectiveness, and it is felt that there is only limited advantage in increasing the slurry solution strength above 1% $FeCl_3$, as most of the ferric chloride required to achieve dissolution is generated during the leaching process by reaction of chlorine with ferrous chloride. Enough hydrochloric acid should be present in the solutions for conductivity purposes and in order to suppress precipitation of metal hydroxides.

In order to provide those skilled in the art with a better understanding of the invention, an integrated and closed system utilizing the process of the invention for treating finely divided chalcopyrite concentrates is described following. For illustrative purposes only, the system is described with respect to the treatment of 100 g. of chalcopyrite concentrate containing 29.0 g. of copper and 31.0 g. of iron. The anode chamber commenced operation with 109 g. of solids therein containing 31.3 g. undissolved Cu and 33.4 g. undissolved Fe in a continuously agitated slurry containing 330.0 cc. of solution, there being 6.6 g. dissolved Cu and 6.6 g. dissolved Fe in the solution. Reactions (1) and (2) proceeded in the anode compartment.

Leached slurry discharged from the anode compartment contained 43.5 g. solids containing 29.6 undissolved Cu and 5.1 g. undissolved Fe (in unreacted chalcopyrite) and 330.0 cc. solution containing 35.0 g. of Cu as cuprous chloride and 34.9 g. of Fe, mostly as ferrous chloride but with some ferric chloride present.

The leached slurry was filtered and the filtrate having a volume of 267.5 cc. and containing 28.4 g. and 28.3 g. of dissolved Cu and Fe, respectively, was fed to the copper cathode chamber of the cell where 28.4 g. of Cu was plated out. The chlorine ions released in the copper cathode chamber migrated to the anode chamber through the diaphragm separating the two. The plated Cu metal was recovered from the cathodes. The spent electrolyte from the copper cathode chamber, containing 267.5 cc. solution with 28.3 g. Fe dissolved therein, mostly in the ferrous state, was treated first for removal of small amounts of Cu by stripping with Fe powder to obtain cement Cu and then was treated for elimination of any ferric iron by reduction to the ferrous state. The so-treated spent electrolyte containing 267.5 cc. solution and 28.3 g. Fe dissolved therein, in the ferrous state, was then passed to the iron cathode chamber in the cell.

The ferrous chloride containing solution was depleted of iron in the iron cathode chambers with 28.3 g. of Fe being removed on the cathodes and the chlorine ions released migrating through the diaphragm into the anode chamber. The Fe-depleted solution containing small amounts of ferrous chloride was removed from the iron cathode chamber. It can be appreciated that economic removal of iron by electro deposition might be somewhat less than 50% of that in the iron cathode chamber feed which would require a circulating load of iron in practice.

The filter cake resulting from the filtering of the anode chamber discharge slurry contained 43.5 g. of solids containing 2.9 g. and 5.1 g. undissolved Cu and Fe respectively therein (primarily as unreacted chalcopyrite) and 62.5 cc. solution containing 6.6 g. and 6.6 g. undissolved Cu and Fe respectively therein. The filter cake was washed with the Fe-depleted solution from the iron cathode chamber and the washings having a volume of 267.5 cc. and containing 6.6 g. Cu and 6.6 g. Fe dissolved therein were returned to the anode chamber.

The washed filter cake weighing 43.5 g. and containing 2.9 g. and 5.1 g. of undissolved Cu and Fe therein, along with 62.5 cc. solution, had 34.5 cc. water added to it along with suitable flotation and frothing reagents and the unreacted sulfides were floated from the remaining solids to form a sulfide concentrate containing 9.0 g. solids containing 2.3 g. and 2.4 g. of undissolved Cu and Fe respectively therein and 62.5 g. of solution. This concentrate was also returned to the anode chamber for further treatment. The flotation tailings containing mostly silica and sulfur and consisting of 34.5 g. of solids and 34.5 cc. of solution, there being 0.6 g. of Cu and 2.7 g. of iron in the solids, were discarded and could, of course, be treated for recovery of elemental sulfur therefrom.

As an alternative to removing excess iron from solution by electro-deposition, iron can be removed as hydroxides and/or iron complexes by precipitation with NaOh produced by electrolysis of NaCl according to the reaction:

$$2\ NaCl + 2\ H_2O + E \rightarrow 2\ NaOH + H_2 + Cl_2$$

The chlorine released can then be used as part of the chlorine used to regenerate ferric chloride from ferrous chloride in the anode chamber.

The process of the invention has been described with specific reference to the treatment of chalcopyrite concentrate but it can be appreciated that the process can be used to treat the range of common copper sulfide/iron sulfide minerals from chalcocite, $Cu_2S$, to chalcopyrite, $CuFeS_2$, for direct recovery of copper therefrom. For example, in the anode chamber bornite would enter into the following reaction:

$$2(x + 2y)\ FeCl_3 + 2x\ CuS\ 2Y\ FeS \rightarrow x\ Cu_2Cl_2 + 2\ (x + 3y)\ FeCl_2 + 2\ (x + y)\ S$$

Covellite would react as follows:

$$2\ FeCl_3 + 2\ CuS \rightarrow Cu_2Cl_2 + 2\ FeCl_2 + 2\ S$$

and chalcocite would act according to the following reaction:

$$2\ FeCl_3 + Cu_2S \rightarrow Cu_2Cl_2 + 2\ FeCl_2 + S$$

Cathode compartment reactions would proceed in a manner similar to that described with reference to chalcopyrite. It can be appreciated that copper concentrates almost always contain some iron but in the event that copper concentrates from pure covellite or chalcocite minerals were being treated by the method of the present invention then there would be no necessity for eliminating iron by electrolytic means or by precipitation as hydroxide. It would only be necessary to regenerate the $FeCl_3$ lixiviant by reacting liberated chlorine with ferrous chloride formed in the anode compartment.

Although the present process has been described specifically with respect to the direct recovery of copper from copper-containing sulfide minerals other base metal sulfide minerals leachable with ferric chloride can be treated for recovery of metals contained therein. Thus, for example, sphalerite concentrate is leached in the anode compartment by FeCl according to the following reaction:

$$2\ FeCl_3 + ZnS \rightarrow ZnCl_2 + 2\ FeCl_2 + S$$

Zinc is, of course, plated out in the cathode compartment of the electrolytic cell and chlorine liberated in the anode compartment regenerates $FeCl_3$ from the $FeCl_2$ formed. Only if iron minerals were present in the sphalerite concentrate would it be necessary to eliminate iron electrolytically or by precipitation as hydroxide.

What we claim as our invention is:

1. A process for the direct recovery of copper from its ores and concentrates which comprises agitating a slurry of finely ground copper sulfide-containing ore or concentrate in a solution of ferric chloride and hydrochloric acid in the anode compartment of an electrolytic cell, said cell having first and second cathode compartments and an anode compartment, the cathode compartments being separated from the anode compartment by diaphragms preventing the movement of solids and liquids but allowing the passage of ions therethrough, removing and filtering the leached slurry to remove sulfur-containing solids therefrom and leaving a filtrate containing cuprous chloride and ferrous chloride, feeding the filtrate to the first cathode compartment in the cell and depositing copper metal from the filtrate on to a first cathode, releasing chloride ions in the first cathode compartment and forming a copper-poor spent electrolyte, substantially eliminating residual copper and any ferric iron from the copper-poor electrolyte to form a solution containing ferrous chloride, feeding the ferrous chloride solution to the second cathode compartment in the cell, depositing iron metal from the solution on to a second cathode, forming an iron-poor spent electrolyte and releasing chloride ions in the second cathode compartment, the chloride ions released in the cathode compartments migrating therefrom to the anode compartment to be liberated as chlorine gas at the anode, oxidizing ferrous iron with said chlorine gas in the anode compartment, returning the iron-poor electrolyte to the anode compartment, recovering copper metal from the first cathode and recovering iron metal from the second cathode.

2. A process as claimed in claim 1 wherein sufficient hydrochloric acid is present in the slurry in the anode compartment to prevent precipitation of metal hydroxides.

3. A process as claimed in claim 2 wherein the slurry in the anode compartment contains not over 25% solids.

4. A process as claimed in claim 2 wherein the sulfur-containing solids are treated to froth flotation to remove unreacted sulfides therefrom and the sulfides so removed are returned to the anode compartment.

5. A process as claimed in claim 1 wherein the slurry in the anode compartment contains not over about 1% ferric chloride.

6. A process as claimed in claim 1 wherein the diaphragms separating the cathode and anode compartments each has an area substantially smaller than that of each of the electrodes.

* * * * *